(12) United States Patent
Maffeis

(10) Patent No.: US 7,396,059 B2
(45) Date of Patent: Jul. 8, 2008

(54) STRUCTURE OF ANGULAR PNEUMATIC GRIPPER

(75) Inventor: Giuseppe Maffeis, Roncadelle (IT)

(73) Assignee: Gimatic S.p.A., Brescia (IT)

( * ) Notice: Subject to any disclaimer, the term of this patent is extended or adjusted under 35 U.S.C. 154(b) by 308 days.

(21) Appl. No.: 10/553,609

(22) PCT Filed: May 3, 2004

(86) PCT No.: PCT/IT2004/000241

§ 371 (c)(1),
(2), (4) Date: Oct. 18, 2005

(87) PCT Pub. No.: WO2004/103645

PCT Pub. Date: Dec. 2, 2004

(65) Prior Publication Data

US 2006/0261619 A1    Nov. 23, 2006

(30) Foreign Application Priority Data

May 22, 2003   (IT) .......................... BS2003A0049

(51) Int. Cl.
*B25J 15/00* (2006.01)
(52) U.S. Cl. ........................................ 294/88; 294/106
(58) Field of Classification Search ................ 294/88, 294/106, 115, 116; 269/32, 34; 901/37
See application file for complete search history.

(56) References Cited

U.S. PATENT DOCUMENTS

| 3,147,993 A | * | 9/1964 | Broderson et al. ............ 294/88 |
| 3,737,157 A | | 6/1973 | Kiwalle |
| 4,565,400 A | * | 1/1986 | Nakashima et al. ........... 294/88 |
| 4,573,727 A | * | 3/1986 | Iikura ......................... 294/115 |
| 4,752,094 A | | 6/1988 | Tabeau |
| 4,874,194 A | * | 10/1989 | Borcea et al. ................. 294/88 |
| 6,273,485 B1 | * | 8/2001 | Maffeis et al. ................ 294/88 |
| 6,290,210 B1 | | 9/2001 | Horn et al. |

FOREIGN PATENT DOCUMENTS

| DE | 198 45 576 | 1/2000 |
| EP | 0 619 166 | 10/1994 |
| JP | 6278859 | 10/1994 |
| WO | WO 03/068456 | 8/2003 |

* cited by examiner

*Primary Examiner*—Dean J Kramer
(74) *Attorney, Agent, or Firm*—McGlew & Tuttle, P.C.

(57) ABSTRACT

The invention concerns an angular pneumatic gripper structure having a body (11) formed of two symmetric and identical elements or shells (15) realized and finished individually using a forming process and then associated and attached face to face to form together a housing chamber of an alternating piston (12) and a structure for receiving and guiding an intermediate drive (13) transversely and some grips (14) so as to turn driven by the piston through the drive. The elements or shells forming the body are made using die-casting, sintering or forging processes with material suitable for these forming techniques.

16 Claims, 6 Drawing Sheets

STRUCTURE OF ANGULAR PNEUMATIC GRIPPER

FIELD OF INVENTION

This invention concerns in general pneumatic grippers for gripping items being machined and/or automatic handling, and refers in particular to improved components for making ready angular pneumatic grippers, that is to say with two jaw holding grips capable of angular movements in opposite closing and opening directions.

STATE OF THE ART

The pneumatic grippers taken into consideration can be different in shape, dimensions and capacity, but each one usually includes a body, a pneumatic piston moving backwards and forwards in a chamber or sleeve in said body, two grips supported and powered in the body, coupled to the piston through a drive, and two jaws fixed to the grip to block an release the item to be handled. The grip are mobile angularly in opposite directions between the opening and closing positions by means of the drive and in response to the alternative movements of the piston. Their rotation can be chosen or adjusted so that, starting from the closed position, each can reach an opening position of about 90°.

The components of said pneumatic grippers are machine-made on machine tools. Usually their body is a single block and it is formed starting from an initial raw block which is opportunely machined and drilled to make it suitable to receive the operating components and accessories of the chuck.

A similar construction process of said chucks is however extremely laborious and costly due to the machining operations and the work times required and often because of the minimum machining tolerances needed.

On the other hand forming techniques, such as die casting, sintering, forging and similar systems are known which enable the construction of items, even finished, with complex shapes and with minimum tolerances and with a high level of precision, both dimensional and surfacial. However, these forming techniques have not been applied to the realisation of the angular pneumatic chucks in question because of the usual configuration of their components.

OBJECTS AND SUMMARY OF THE INVENTION

An objects of this invention is to adopt advantageously some of the forming techniques mentioned above in the realisation of pneumatic angular grippers so as to eliminate or at least to minimize times and costs of construction and assembly of said chucks.

Another object of the invention is the realisation of an angular pneumatic gripper composed of a limited number of pre-shaped components, capable of joining complementarily with each other and with interposed auxiliary elements, ensuring the functionality of the resulting gripper, better still increasing the performance and life of the same.

In order to achieve the above objects of the invention, the body of the gripper is made up of two complementary parts manufactured individually using one of the abovementioned techniques and then assembled to form a solid block ready to receive, support and guide other structural and functional components of the gripper which can also be made using the same forming techniques.

BRIEF DESCRIPTION OF DRAWINGS

The gripper of the invention will however be described more in detail in the description that follows made with reference to the attached drawings, which are indicative and not limiting, in which.

DETAILED DESCRIPTION OF THE INVENTION

Figure 1:
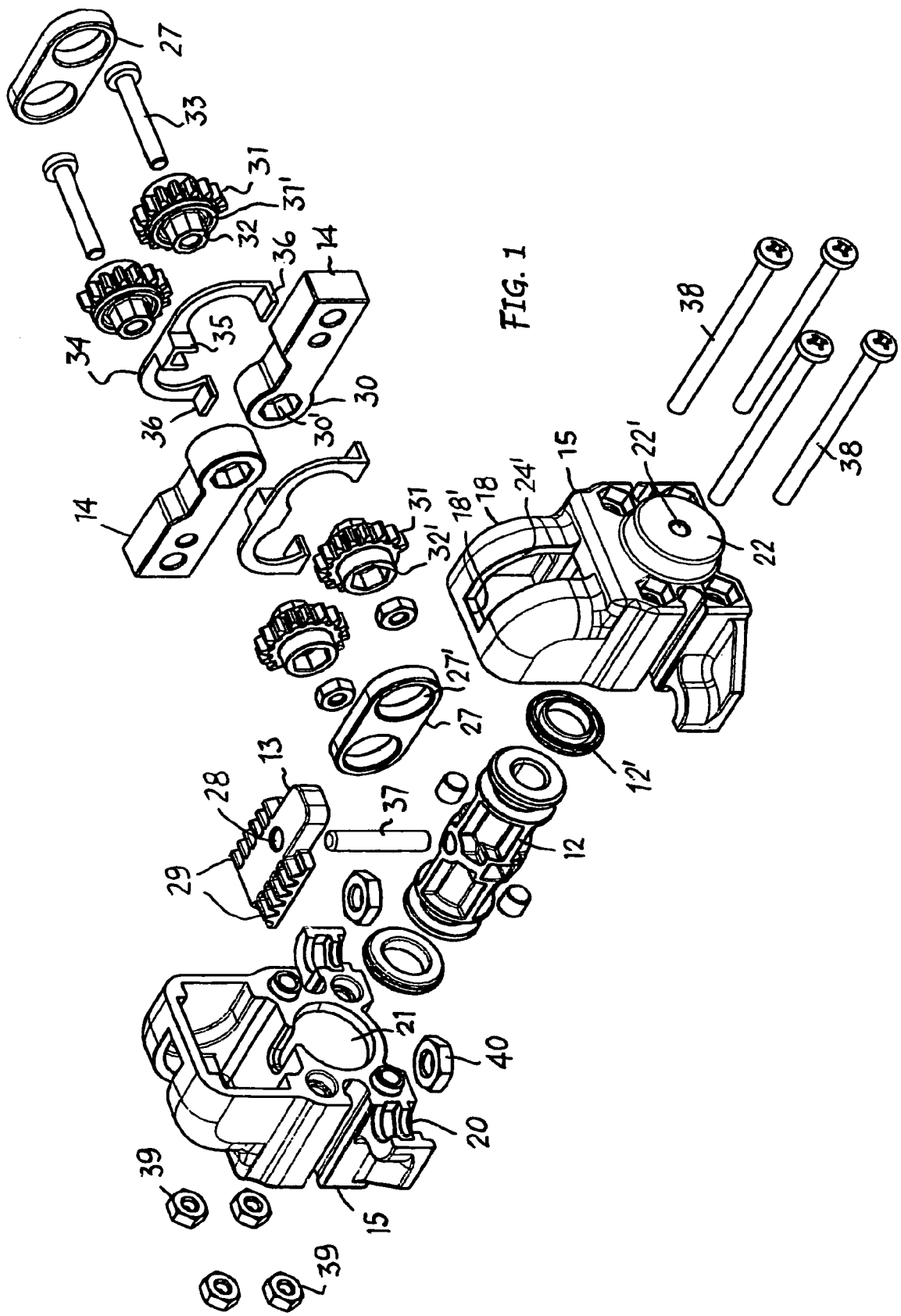
FIG. 1 shows an exploded view in perspective of the components for the realisation of an angular pneumatic gripper according to the invention.

The angular pneumatic gripper shown comprises a body 11, a piston 12 moving in said body, a drive 13 associated with the piston 12, two grips 14, turning in opposite directions, each on its own pin or axis 14', moved by the piston 12 through of the drive 13, and two gripper jaws, not shown, attached to the ears.

The body 11 is made up of two symmetric elements or shells 15 which are identical and therefore made using the same mould, advantageously using die-casting, sintering or forging forming processes using any appropriate raw material.

Figure 2:
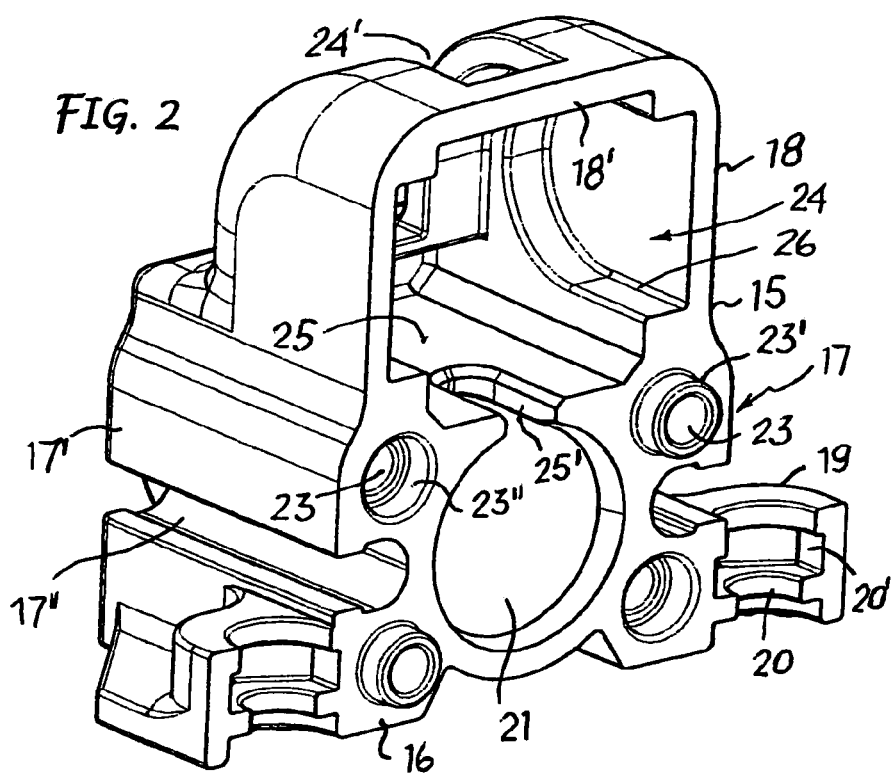
FIG. 2 shows an enlarged view in perspective of one of the two shells for the formation of the gripper body, the other shell being identical.
Figure 8:
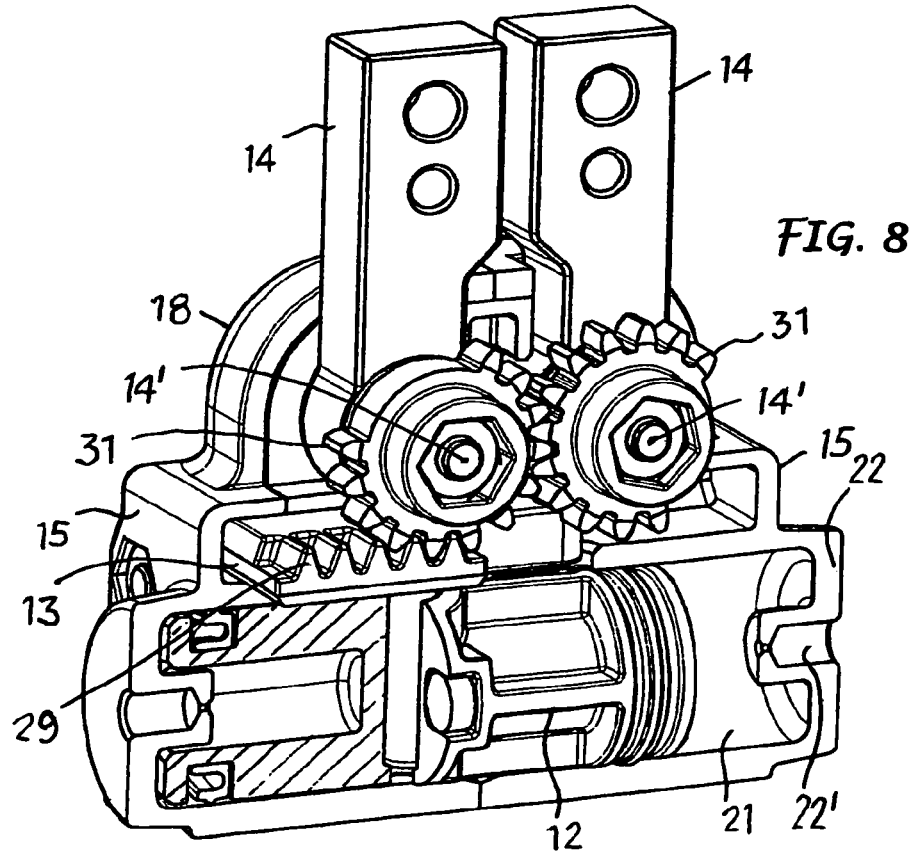
FIG. 8 shows a cross section of the assembled chuck with the grips in the closed position.

The two shells 15 are positioned one facing the other. They are matched and then attached to each other as will be described below. Each of them—FIG. 2—has a support base 16 from which an intermediate section 17 rises overlooked by two shoulders 18 connected by a top crosspiece 18'.

Two ears 19 protrude from opposite sides if the support base 16, each one having a semi-hole 20, perpendicular to the base, opening towards the facing shell 15 and having an internal semi-hexagonal recess 20'.

The intermediate section 17 of each shell 15 centrally forms a cylindrical cavity 21 the axis of which is parallel to the support base 16. Said cavity 21 is open towards the homologous cavity of the facing shell, whereas the opposite part is closed by an end wall 22 in which a hole 22' is drilled. Laterally, the intermediate portion 17 has two sides 17' each of which has a longitudinal groove 17" parallel to the axis of said cylindrical cavity 21.

In the intermediate section 17, on the opposite parts of the cylindrical cavity 21 and parallel to it, holes 23 are drilled symmetrically, for example two 20 on each side. From the open side of the cavity 21, in line with the two holes 23 mentioned, and diagonally opposite, centering lugs 23' have been shaped, whereas in line with the other two holes 23 there are recesses 23".

The top shoulders 18 of each shell 15 form a chamber 24 in the manner of a protective cap 34, which on one side is open towards the front shell and on the other has an opening 24'. In the chamber 24 there is a sliding surface 25 at the bottom and on the sides opposite this, two housings 26. The sliding surface 25 is placed in parallel above the cylindrical cavity 21 and has at one end, on the open side of said cavity, a half-slot 25'. In each lateral housing 26 inside the chamber 24 is housed a support element 27 to support the nins or rotation axis 14' of the ears 14.

The piston 12, the drive 13, the grips 14 and the supports 27 can also be realised using one of the forming techniques mentioned above.

The piston 12 is equipped with peripheral seals 12' and dimensioned to be housed and slide in the cylindrical cavities 21 of the two shells when these are joined together to form the body 11.

The drive 13 is sledge shaped and has a central hole 28 and on the two opposite sides two indexing rack sections 29.

The grips 14 are formed by the same mould. Each of them has a cylindrical bottom section 30 crossed by a polygonal hole 30'. Each grip is associated with two gear wheels 31, one on each side, each one having, on one side, a polygonal hub 32 to house and fit into the transverse polygonal hole 30' of the grip and, on the opposite side, a cylindrical hub 32' to house and turn in a corresponding housing 27' shaped in the above-mentioned support element 27. A bolt 33 passing through the hubs 32, 32' of the geared wheels 31 fixed these to the sides of the respective ear 14 and forms the rotation axis 14' of the ear on and with respect to the support element 27.

On the side of each geared wheel 31 on the side of the polygonal hub 32, therefore towards the ear 14, a neck 31' is shaped to which the protective cap 34 is associated. This cap is shaped to engage at the same time with the neck of the collateral gear wheels of the two grips. Both above the center and below the ends, it has some overhangs 35, 36, respectively, facing towards the cap associated with the facing gear wheels and acting as scrapers for the external surface of the cylindrical section of the grips.

Figure 3:
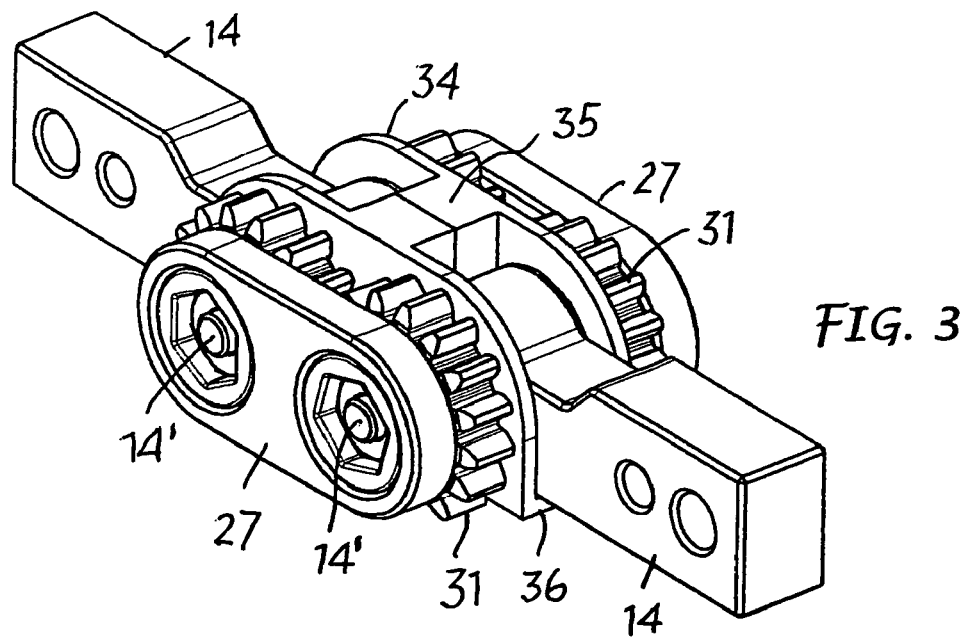
FIG. 3 shows a view in perspective of the assembled grips with the relative support, control and protection elements.
Figure 4:
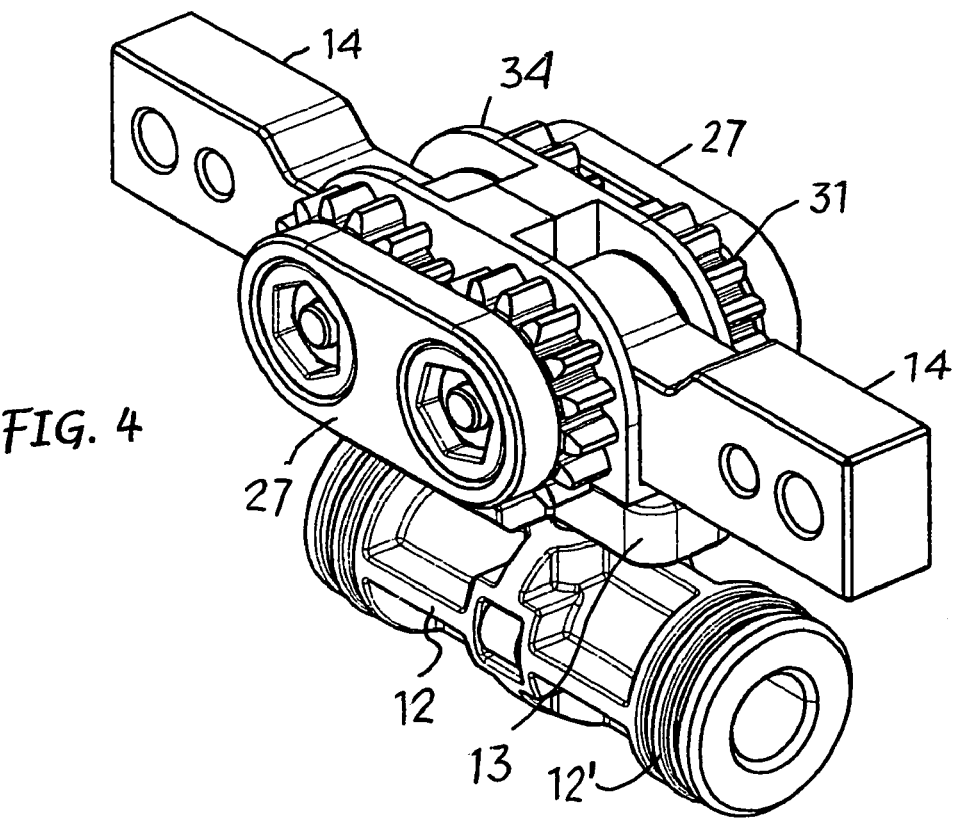
FIG. 4 shows the group in FIG. 3 associated with a drive piston.
Figure 5:
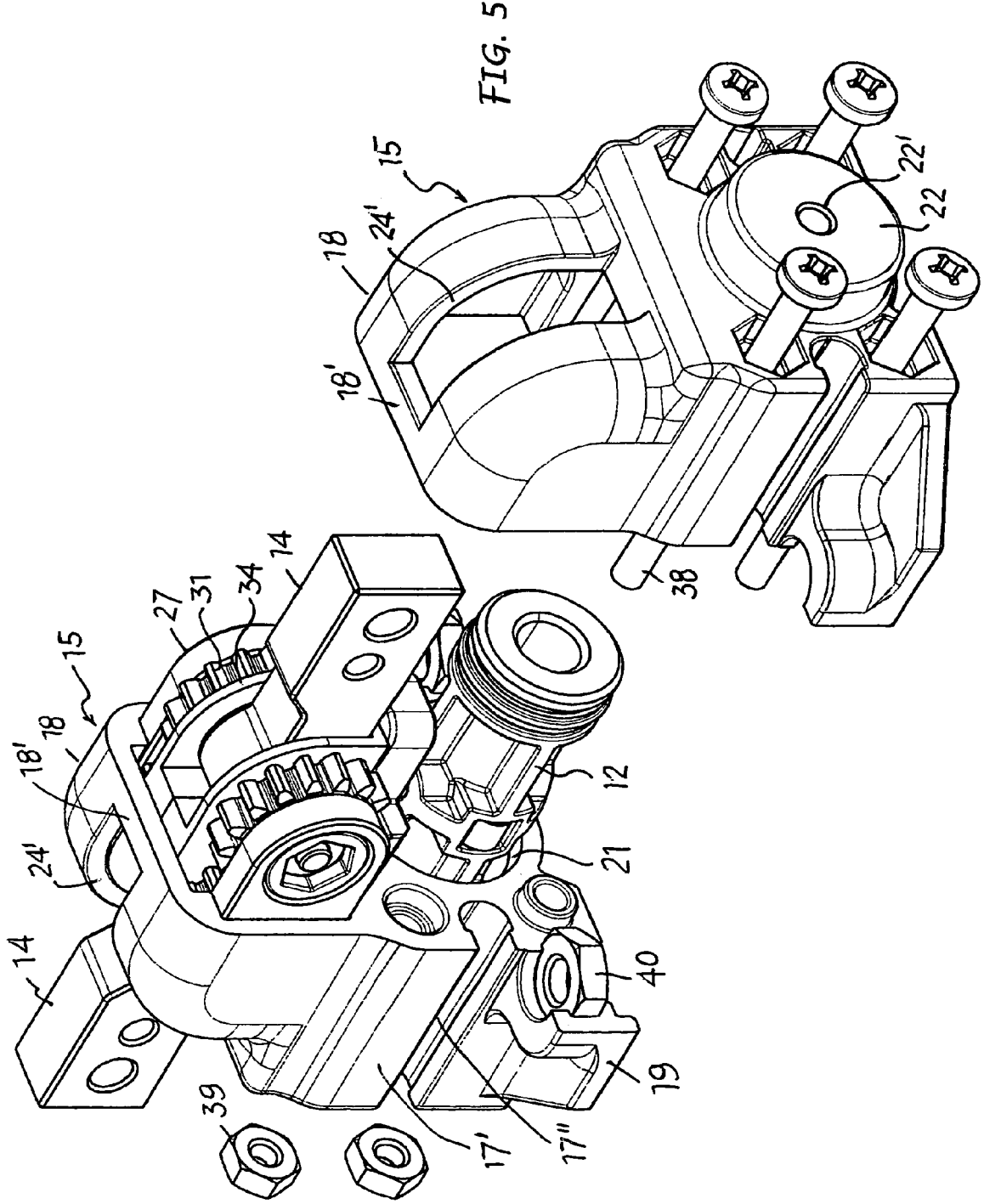
FIG. 5 shows an intermediate assembly phase of the gripper.
Figure 6:
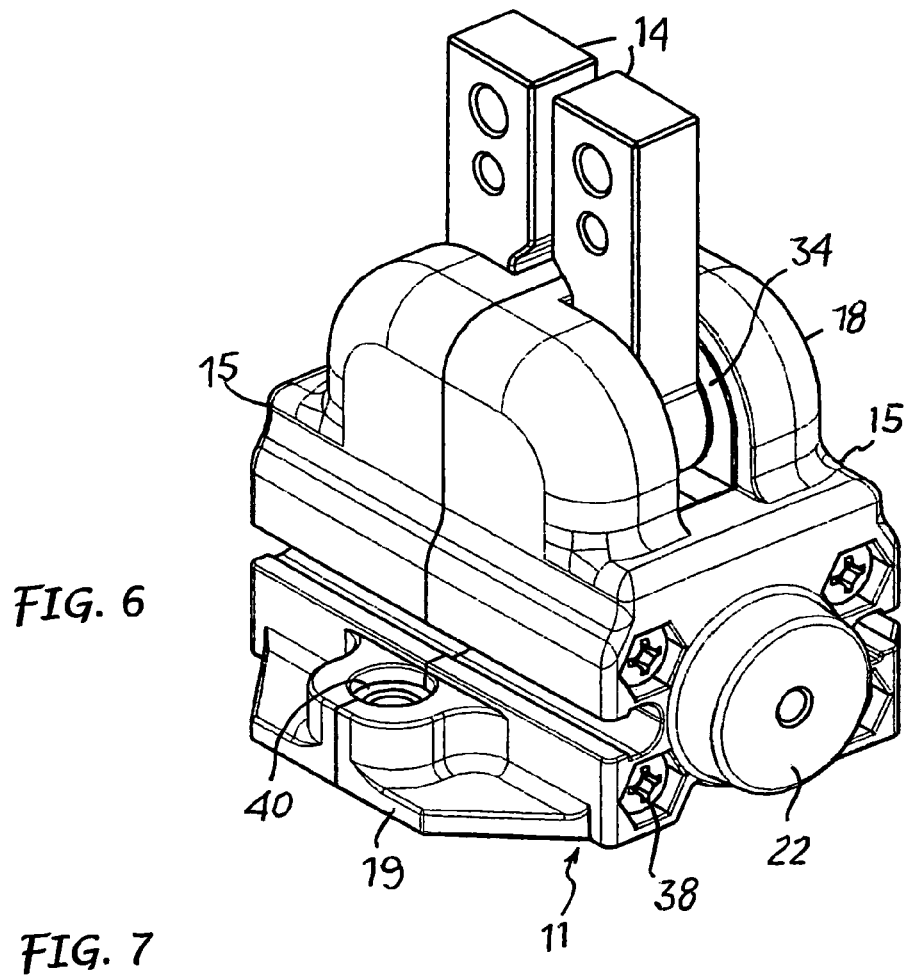
FIGS. 6 and 7 show, respectively, an assembled gripper with the grips in the closed and open position.
Figure 7:
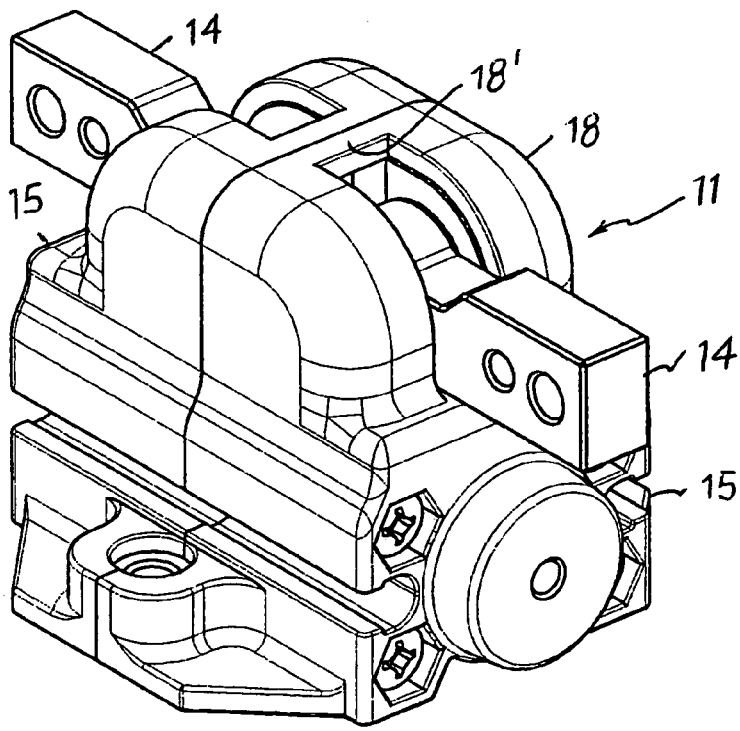
Figure 9:
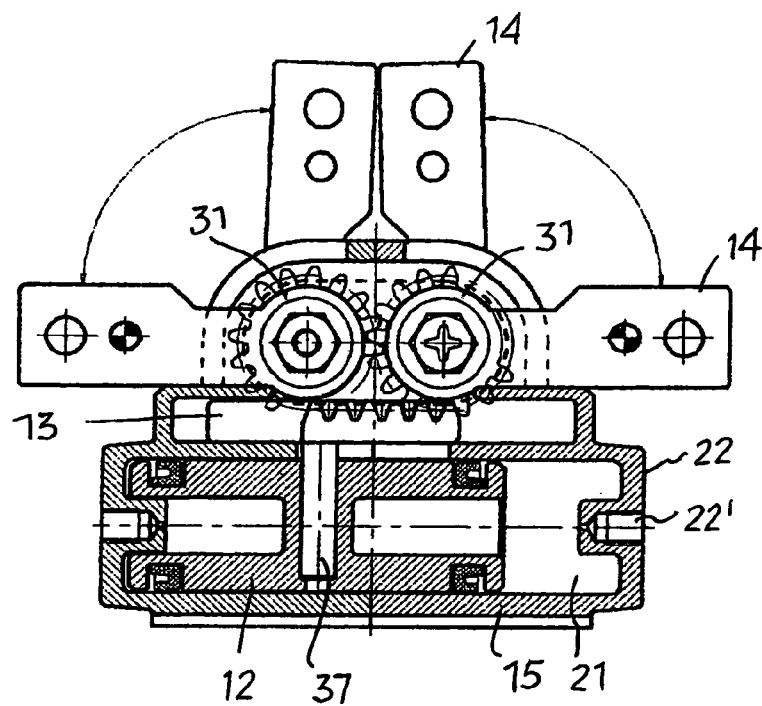
FIGS. 9 and 10 show, respectively, a longitudinal section and a cross section of the assembled gripper.
Figure 10:
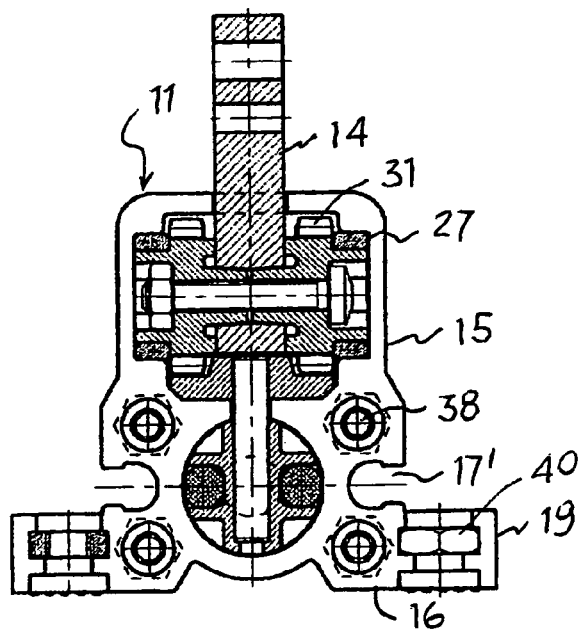
Figure 11:
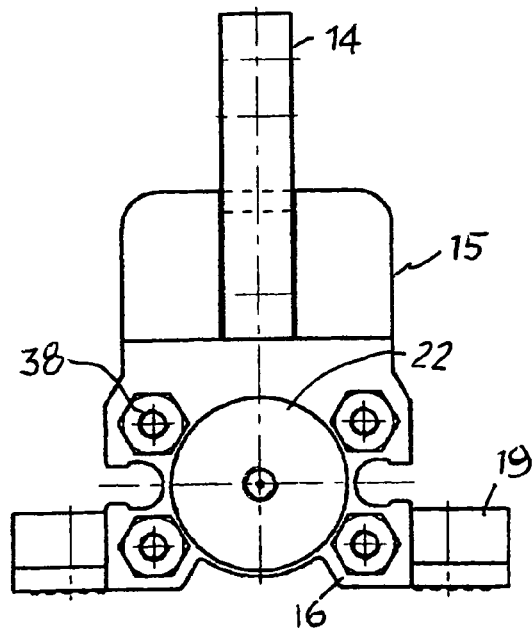
FIG. 11 is an end view of the assembled gripper.

For equipping one gripper, the geared wheels 31 are fixed to the opposite sides of the two grips 14, by the interposition of the protective caps 34 between the geared wheels and the grips and making sure that the two collateral geared wheels interlock and their cylindrical hubs 32' are supported on the support elements 27 as shown in FIG. 3. Then the drive 13 is linked on one side to the geared wheels 31 and on the other to the piston 12 as shown in FIG. 4. The drive 13 is positioned with its indexing rack 29 facing towards the geared wheels 31 on the sides of one of the grips to mesh with them, and is connected to the piston 12 by means of a drive pin 37—FIGS. 1, 9 and 10. The subassembly assembled in this way and corresponding to FIG. 4 is then mounted between the two shells 15 positioned facing each other as shown in FIG. 5. To be precise the piston 12 is made to house in the cylindrical cavities 21 which are in line, forming together a chamber for the piston, and the drive pin 37 houses in the slot 25' above said cavities. In this way the drive 13 rests on the sliding surface 25, the support elements 27 fit into the housings 26 formed by the top shoulders 18 of the shells themselves and the grips 14 reach into the gaps between said shoulders. Finally the two shells 15 are fixed to each other by means of bolts 38 and relative nuts 39 inserted in the holes 23 so as to form a single body encompassing the function elements of the gripper, as shown in FIGS. 6 and 7. With the shells assembled the lateral ears 19 form with their half-holes 20, housings for the anchoring screws of the gripper on a support when in use. In each of said housings 20, thanks to the semi-hexagonal recesses 20', a nut 40 can be housed and retained which allows the application of a respective anchoring screw both from the bottom and the top, according to needs.

In the gripper manufactured in this way, the piston can be simple or double effect moved by a pneumatic fluid delivered/discharged alternatively in the cavity in which the piston is housed. The alternating movements of the piston correspond to similar movements of the drive 13, whose indexing rack provoke, through the meshed geared wheels, the rotation of the grips in opposite directions between a closed position in which the grips are neared—FIG. 5, and an open position in which the grips are separated, turned in opposite directions—FIG. 7. Rotation of the grips can reach up to about 90° and can, however, be adjusted with the use of spacers which limit the stroke of the piston.

The invention claimed is:

1. An angular pneumatic gripper, comprising:
a body including a first element and a second element, said first element being symmetrical and identical to said second element, said first element and said second element being positioned such that said first element is disposed opposite said second element, said first element and said second element defining a cylindrical cavity within said body;
an angular pneumatic piston for reciprocating in said cylindrical cavity of said body;
a drive element;
two gripper elements for gripping and releasing an item, said gripper elements being supported and guided in said body, said gripper elements being coupled to said piston via said drive element, said gripper elements being movable at angles in opposite directions between an open and closed position via said drive element and via movement of said piston, said first element and said second element defining a means for receiving and guiding said drive element; said first element and said second element being formed via die-casting, sintering or forging processes, each element of said body having a support base, an intermediate section element, two shoulder elements and a top crosspiece, each shoulder element being connected to said top crosspiece and said intermediate section element, said intermediate section of each element centrally forming said cylindrical cavity, said cylindrical cavity having an open end and a closed end, said open end of said cylindrical cavity of said first element being opposite said open end of said cylindrical cavity of said second element, said first element and said second element having a top wall, two housing elements and a sliding surface, said top wall, said two housing elements and said sliding surface defining a chamber having a first opening on one side and a second opening on another side, one housing element being opposite another housing element, said first opening of said first element being opposite said first opening of said second element, said sliding surface being positioned parallel above said cylindrical cavity and having a half-slot located at a side of said first opening, said intermediate section defining holes for receiving fasteners, said holes being adjacent said cylindrical cavity and extending parallel to said cylindrical cavity, said first element being fixed to said second element such that said chamber of said first element and said chamber of said second element form a drive receiving chamber and said cylindrical cavity of said first element and said cylindrical cavity of said second element form a piston receiving chamber and said half-slot of said first element and said half-slot of said second element form a full slot, said drive element engaging said sliding surface of said first element and said second element, said drive element being connected to said piston via a through pin, said through pin extending through said full slot, one gripper element extending through said second opening of said first element, another gripper element extending through second opening of said second element, whereby a portion of each gripper element is located within said drive receiving chamber.

2. An angular pneumatic chuck according to claim 1, further comprising:
a first geared wheel;
a second geared wheel;
a support element defining a receiving hole, wherein each gripper element has a lower cylindrical section, said lower cylindrical section defining a polygonal hole, said lower cylindrical section being coupled to said first geared wheel and said second geared wheel, said first geared wheel being located on one side of said lower cylindrical section and said second geared wheel being located on another side of said lower cylindrical section, each geared wheel having a polygonal hub on one side, said polygonal hole receiving said polygonal hub; each geared wheel having a cylindrical hub on another side, said receiving hole of said support hole receiving said cylindrical hub, said first geared wheel and said second geared wheel being attached to one of said gripper elements via a bolt extending through the hubs of the geared wheels, said bolt forming an axis of rotation axis of the gripper element, said support element supporting collateral gear wheels of the two gripper elements.

3. An angular pneumatic gripper according to claim 2, wherein said drive element has a pair of indexing racks, each indexing rack engaging said first geared wheel and said second geared wheel of one of said gripper elements, said first geared wheel of one gripper element engaging said first gear wheel of another gripper element, said second geared wheel of said one gripper element engaging said second geared wheel of said another gripper element.

4. An angular pneumatic gripper according to claim 3, wherein each element has a support base and an intermediate section, said support base having two lugs, one lug being located on one side of said support base and another lug being located on another side of said support base, each lug defining a half-hole for receiving anchoring screws, said intermediate section defining longitudinal grooves for applying accessories, one longitudinal groove extending along one side of said intermediate section and another longitudinal groove extending along another side of said intermediate section.

5. An angular pneumatic gripper according to claim 2, further comprising a protective cap located on the side of each geared wheel on the side of the polygonal hub, said cap having flanges located at a top center portion thereof and at the bottom ends thereof, said flanges facing opposite said gripper elements, said protective cap engaging said first geared wheel of one gripper element and said first geared wheel of another gripper element, said flanges of one protective cap located on one side of said gripper elements engaging said flanges of another protective cap located on another side of said gripper elements.

6. An angular pneumatic gripper according to claim 5, wherein each element has a support base and an intermediate section, said support base having two lugs, one lug being located on one side of said support base and another lug being located on another side of said support base, each lug defining a half-hole for receiving anchoring screws, said intermediate section defining longitudinal grooves for applying accessories, one longitudinal groove extending along one side of said intermediate section and another longitudinal groove extending along another side of said intermediate section.

7. An angular pneumatic gripper according to claim 2, wherein each element has a support base and an intermediate section, said support base having two lugs, one lug being located on one side of said support base and another lug being located on another side of said support base, each lug defining a half-hole for receiving anchoring screws, said intermediate section defining longitudinal grooves for applying accessories, one longitudinal groove extending along one side of said intermediate section and another longitudinal groove extending along another side of said intermediate section.

8. An angular pneumatic gripper according to claim 1, wherein each element has a support base and an intermediate section, said support base having two lugs, one lug being located on one side of said support base and another lug being located on another side of said support base, each lug defining a half-hole for receiving anchoring screws, said intermediate section defining longitudinal grooves for applying accessories, one longitudinal groove extending along one side of said intermediate section and another longitudinal groove extending along another side of said intermediate section.

9. An angular pneumatic gripper, comprising:
a body including a first element and a second element, said first element being symmetrical and identical to said second element, said first element and said second element being positioned such that said first element is disposed opposite said second element, said first element and said second element defining a cavity within said body;
an angular pneumatic piston for reciprocating in said cavity of said body;
a drive element;
two gripper elements for gripping and releasing an item, said gripper elements being supported and guided in said body, said gripper elements being coupled to said piston via said drive element, said gripper elements being movable at angles in opposite directions between an open and closed position via said drive element and via reciprocating movements of said piston, said first element and said second element defining a means for receiving and guiding said drive element, said first element and said second element being formed via die-casting, sintering or forging processes
a first geared wheel;
a second geared wheel;
a support element defining a receiving hole, wherein each gripper element has a lower cylindrical section, said lower cylindrical section defining a polygonal hole, said lower cylindrical section being coupled to said first geared wheel and said second geared wheel, said first geared wheel being located on one side of said lower cylindrical section and said second geared wheel being located on another side of said lower cylindrical section, each geared wheel having a polygonal hub on one side, said polygonal hole receiving said polygonal hub, each geared wheel having a cylindrical hub on another side, said receiving hole of said support hole receiving said cylindrical hub, said first geared wheel and said second geared wheel being attached to one of said gripper elements via a bolt extending through the hubs of the geared wheels, said bolt forming an axis of rotation of the gripper element, said support element supporting collateral geared wheels of the two gripper elements.

10. An angular pneumatic gripper, comprising:
a body including a first element and a second element, said first element being symmetrical and identical to said second element, said first element and said second element being positioned such that said first element is disposed opposite said second element, said first element and said second element defining a cavity within said body;

an angular pneumatic piston for reciprocating in said cavity of said body;

a drive element;

two gripper elements for gripping and releasing an item, said gripper elements being supported and guided in said body, said gripper elements being coupled to said piston via said drive element, said gripper elements being movable at angles in opposite directions between an open and closed position via said drive element and via movement of said piston, said first element and said second element defining a means for receiving and guiding said drive element, said first element and said second element being formed via die-casting, sintering or forging processes a first geared wheel;

a second geared wheel;

a support element defining a receiving hole, wherein each gripper element has a lower cylindrical section, said lower cylindrical section defining a polygonal hole, said lower cylindrical section being coupled to said first geared wheel and said second geared wheel, said first geared wheel being located on one side of said lower cylindrical section and said second geared wheel being located on another side of said lower cylindrical section, each geared wheel having a polygonal hub on one side, said polygonal hole receiving said polygonal hub, each geared wheel having a cylindrical hub on another side, said receiving hole of said support hole receiving said cylindrical hub, said first geared wheel and said second geared wheel being attached to one of said gripper elements via a bolt extending through the hubs of the geared wheels, said bolt forming an axis of rotation of the gripper element, said support element supporting collateral geared wheels of the two gripper elements, said drive element having a pair of indexing racks, each indexing rack engaging said first geared wheel and said second geared wheel of one of said gripper elements, said first geared wheel of one gripper element engaging said first gear wheel of another gripper element, said second geared wheel of said one gripper element engaging said second geared wheel of said another gripper element.

11. An angular pneumatic gripper, comprising:

a body including a first element and a second element, said first element being symmetrical and identical to said second element, said first element and said second element being positioned such that said first element is disposed opposite said second element, said first element and said second element defining a cavity within said body;

an angular pneumatic piston for reciprocating in said cavity of said body;

a drive element;

two gripper elements for gripping and releasing an item, said gripper elements being supported and guided in said body, said gripper elements being coupled to said piston via said drive element, said gripper elements being movable at angles in opposite directions between an open and closed position via said drive element and via movement of said piston, said first element and said second element defining a means for receiving and guiding said drive element, said first element and said second element being formed via die-casting, sintering or forging processes a first geared wheel;

a second geared wheel;

a support element defining a receiving hole, wherein each gripper element has a lower cylindrical section, said lower cylindrical section defining a polygonal hole, said lower cylindrical section being coupled to said first geared wheel and said second geared wheel, said first geared wheel being located on one side of said lower cylindrical section and said second geared wheel being located on another side of said lower cylindrical section, each geared wheel having a polygonal hub on one side, said polygonal hole receiving said polygonal hub, each geared wheel having a cylindrical hub on another side, said receiving hole of said support hole receiving said cylindrical hub, said first geared wheel and said second geared wheel being attached to one of said gripper elements via a bolt extending through the hubs of the geared wheels, said bolt forming an axis of rotation of the gripper element, said support element supporting collateral geared wheels of the two gripper elements;

a protective cap located on the side of each geared wheel on the side of the polygonal hub, said cap having flanges located at a top center portion thereof and at the bottom ends thereof, said flanges facing opposite said gripper elements, said protective cap engaging said first geared wheel of one gripper element and said first geared wheel of another gripper element, said flanges of one protective cap located on one side of said gripper elements engaging said flanges of another protective cap located on another side of said gripper elements.

12. An angular pneumatic gripper, comprising:

a body including a first element and a second element, said first element being symmetrical and identical to said second element, said first element and said second element being positioned such that said first element is disposed opposite said second element, said first element and said second element defining a cylindrical cavity within said body;

an angular pneumatic piston reciprocating in said cylindrical cavity of said body;

a drive element;

two gripper elements for gripping and releasing an item, said gripper elements being supported and guided in said body, said gripper elements being coupled to said piston via said drive element, said gripper elements being movable at angles in opposite directions between an open and closed position via said drive element and via movement of said piston, said first element and said second element defining a means for receiving and guiding said drive element, said first element and said second element being formed via die-casting, sintering or forging processes, each element of said body having a support base, an intermediate section element, two shoulder elements and a top crosspiece, each shoulder element being connected to said top crosspiece and said intermediate section element, said intermediate section of each element centrally forming said cylindrical cavity, said cylindrical cavity having an open end and a closed end, said open end of said cylindrical cavity of said first element being opposite said open end of said cylindrical cavity of said second element, said first element and said second element having a top wall, two housing elements and a sliding surface, said top wall, said two housing elements and said sliding surface defining a chamber having a first opening on one side and a second opening on another side, one housing element being opposite another housing element, said first opening of said first element being opposite said first opening of said second element, said sliding surface being positioned parallel above said cylindrical cavity and having a half-slot located at a side of said first opening, said intermediate section defining holes for receiving fasteners, said holes being adjacent said cylindrical cavity and extending parallel to said cylindrical cavity, said first element being fixed to said second element such that said chamber of said first element and said chamber of said second element form a drive receiving chamber and said cylindrical cavity of said first element and said cylindrical cavity of said second element form a piston receiving chamber and said half-slot of first element and said half-slot of said second element form a full slot, said drive element engaging said sliding surface of said first element and said second element, said drive element being connected to said piston via a through pin, said through pin extending through said full slot, one gripper element extending through said second opening of said first element, another gripper element extending through said second opening of said second element, whereby a portion of each gripper element is located within said drive receiving chamber;

a first geared wheel;

a second geared wheel;

a support element defining a receiving hole, wherein each gripper element has a lower cylindrical section, said lower cylindrical section defining a polygonal hole, said lower cylindrical section being coupled to said first geared wheel and said second geared wheel, said first geared wheel being located on one side of said lower cylindrical section and said second geared wheel being located on another side of said lower cylindrical section, each geared wheel having a polygonal hub on one side, said polygonal hole receiving said polygonal hub, each geared wheel having a cylindrical hub on another side, said receiving hole of said support hole receiving said cylindrical hub, said first geared wheel and said second geared wheel being attached to one of said gripper elements via a bolt extending through the hubs of the geared wheels, said bolt forming an axis of rotation of the gripper element, said support element supporting collateral geared wheels of the two gripper elements.

13. An angular pneumatic gripper, comprising:

a body including a first element and a second element, said first element being symmetrical and identical to said second element, said first element and said second element being positioned such that said first element is disposed opposite said second element, said first element and said second element defining a cylindrical cavity within said body, each element having a support base and an intermediate section, said support base having two lugs, one lug being located on one side of said support base and another lug being located on another side of said support base, each lug defining a half-hole for receiving anchoring fasteners, said intermediate section defining longitudinal grooves for applying accessories, one longitudinal groove extending along one side of said intermediate section and another longitudinal groove extending along another side of said intermediate section;

an angular pneumatic piston for reciprocating in said cylindrical cavity of said body;

a drive element;

two gripper elements for gripping and releasing an item, said gripper elements being supported and guided in said body, said gripper elements being coupled to said piston via said drive element, said gripper elements being movable at angles in opposite directions between an open and closed position via said drive element and via movement of said piston, said first element and said second element defining a means for receiving and guiding said drive element, said first element and said second element being formed via die-casting, sintering or forging processes, each element of said body having a support base, an intermediate section element, two shoulder elements and a top crosspiece, each shoulder element being connected to said top crosspiece and said intermediate section element, said intermediate section of each element centrally forming said cylindrical cavity, said cylindrical cavity having an open end and a closed end, said open end of said cylindrical cavity of said first element being opposite said open end of said cylindrical cavity of said second element, said first element and said second element having a top wall, two housing elements and a sliding surface, said top wall, said two housing elements and said sliding surface defining a chamber having a first opening on one side and a second opening on another side, one housing element being opposite another housing element, said first opening of said first element being opposite said first opening of said second element, said sliding surface being positioned parallel above said cylindrical cavity and having a half-slot located at a side of said first opening, said intermediate section defining holes for receiving fasteners, said holes being adjacent said cylindrical cavity and extending parallel to said cylindrical cavity, said first element being fixed to said second element such that said chamber of said first element and said chamber of said second element form a drive receiving chamber and said cylindrical cavity of said first element and said cylindrical cavity of said second element form a piston receiving chamber and said half-slot of first element and said half-slot of said second element form a full slot, said drive element engaging said sliding surface of said first element and said second element, said drive element being connected to said piston via a through pin, said through pin extending through said full slot, one gripper element extending through said second opening of said first element, another gripper element extending through said second opening of said second element, whereby a portion of each gripper element is located within said drive receiving chamber.

14. An angular pneumatic gripper, comprising:

a body including a first element and a second element, said first element being symmetrical and identical to said second element, said first element and said second element being positioned such that said first element is disposed opposite said second element, said first element and said second element defining a cavity within said body, each element having a support base and an intermediate section, said support base having two lugs, one lug being located on one side of said support base and another lug being located on another side of said support base, each lug defining a half-hole for receiving anchoring fasteners, said intermediate section defining longitudinal grooves for applying accessories, one longitudinal groove extending along one side of said intermediate section and another longitudinal groove extending along another side of said intermediate section;

an angular pneumatic piston for reciprocating in said cavity of said body;

a drive element;

two gripper elements for gripping and releasing an item, said gripper elements being supported and guided in said body, said gripper elements being coupled to said piston via said drive element, said gripper elements being movable at angles in opposite directions between an open and closed position via said drive element and via movement of said piston, said first element and said second element defining a means for receiving and guiding said drive element, said first element and said second element being formed via die-casting, sintering or forging processes a first geared wheel;

a second geared wheel;

a support element defining a receiving hole, wherein each gripper element has a lower cylindrical section, said lower cylindrical section defining a polygonal hole, said lower cylindrical section being coupled to said first geared wheel and said second geared wheel, said first geared wheel being located on one side of said lower cylindrical section and said second geared wheel being located on another side of said lower cylindrical section, each geared wheel having a polygonal hub on one side, said polygonal hole receiving said polygonal hub, each geared wheel having a cylindrical hub on another side, said receiving hole of said support hole receiving said cylindrical hub, said first geared wheel and said second geared wheel being attached to one of said gripper elements via a bolt extending through the hubs of the geared wheels, said bolt forming an axis of rotation of the gripper element, said support element supporting collateral geared wheels of the two gripper elements.

15. An angular pneumatic gripper, comprising:

a body including a first element and a second element, said first element being symmetrical and identical to said second element, said first element and said second element being positioned such that said first element is disposed opposite said second element, said first element and said second element defining a cavity within said body, each element having a support base and an intermediate section, said support base having two lugs, one lug being located on one side of said support base and another lug being located on another side of said support base, each lug defining a half-hole for receiving anchoring fasteners, said intermediate section defining longitudinal grooves for applying accessories, one longitudinal groove extending along one side of said intermediate section and another longitudinal groove extending along another side of said intermediate section;

an angular pneumatic piston for reciprocating in said cavity of said body;

a drive element;

two gripper elements for gripping and releasing an item, said gripper elements being supported and guided in said body, said gripper elements being coupled to said piston via said drive element, said gripper elements being movable at angles in opposite directions between an open and closed position via said drive element and via movement of said piston, said first element and said second element defining a means for receiving and guiding said drive element, said first element and said second element being formed via die-casting, sintering or forging processes a first geared wheel;

a second geared wheel;

a support element defining a receiving hole, wherein each gripper element has a lower cylindrical section, said lower cylindrical section defining a polygonal hole, said lower cylindrical section being coupled to said first geared wheel and said second geared wheel, said first geared wheel being located on one side of said lower cylindrical section and said second geared wheel being located on another side of said lower cylindrical section, each geared wheel having a polygonal hub on one side, said polygonal hole receiving said polygonal hub, each geared wheel having a cylindrical hub on another side, said receiving hole of said support hole receiving said cylindrical hub, said first geared wheel and said second geared wheel being attached to one of said gripper elements via a bolt extending through the hubs of the geared wheels, said bolt forming an axis of rotation of the gripper element, said support element supporting collateral geared wheels of the two gripper elements, said drive element having a pair of indexing racks, each indexing rack engaging said first geared wheel and said second geared wheel of one of said gripper elements, said first geared wheel of one gripper element engaging said first gear wheel of another gripper element, said second geared wheel of said one gripper element engaging said second geared wheel of said another gripper element.

16. An angular pneumatic gripper, comprising:

a body including a first element and a second element, said first element being symmetrical and identical to said second element, said first element and said second element being positioned such that said first element is disposed opposite said second element, said first element and said second element defining a cavity within said body, each element having a support base and an intermediate section, said support base having two lugs, one lug being located on one side of said support base and another lug being located on another side of said support base, each lug defining a half-hole for receiving anchoring fasteners, said intermediate section defining longitudinal grooves for applying accessories, one longitudinal groove extending along one side of said intermediate section and another longitudinal groove extending along another side of said intermediate section;

an angular pneumatic piston for reciprocating in said cavity of said body;

a drive element;

two gripper elements for gripping and releasing an item, said gripper elements being supported and guided in said body, said gripper elements being coupled to said piston via said drive element, said gripper elements being movable at angles in opposite directions between an open and closed position via said drive element and via movement of said piston, said first element and said second element defining a means for receiving and guiding said drive element, said first element and said second element being formed via die-casting, sintering or forging processes a first geared wheel;

a second geared wheel;

a support element defining a receiving hole, wherein each gripper element has a lower cylindrical section, said lower cylindrical section defining a polygonal hole, said lower cylindrical section being coupled to said first geared wheel and said second geared wheel, said first geared wheel being located on one side of said lower cylindrical section and said second geared wheel being located on another side of said lower cylindrical section, each geared wheel having a polygonal hub on one side, said polygonal hole receiving said polygonal hub, each geared wheel having a cylindrical hub on another side, said receiving hole of said support hole receiving said cylindrical hub, said first geared wheel and said second geared wheel being attached to one of said gripper elements via a bolt extending through the hubs of the geared wheels, said bolt forming an axis of rotation of the gripper element, said support element supporting collateral geared wheels of the two gripper elements;

a protective cap located on the side of each geared wheel on the side of the polygonal hub, said cap having flanges located at a top center portion thereof and at the bottom ends thereof, said flanges facing opposite said gripper elements, said protective cap engaging said first geared wheel of one gripper element and said first geared wheel of another gripper element, said flanges of one protective cap located on one side of said gripper elements engaging said flanges of another protective cap located on another side of said gripper elements.

* * * * *